//pragma
United States Patent

Keiser, Jr.

[15] 3,641,669
[45] Feb. 15, 1972

[54] GRASS SHEARS

[72] Inventor: David Howard Keiser, Jr., 53 Park Road, Reading, Pa. 19610

[22] Filed: Sept. 30, 1969

[21] Appl. No.: 862,304

[52] U.S. Cl. ........................................................30/260
[51] Int. Cl. ....................................................B26b 13/04
[58] Field of Search .............................30/248, 260, 349

[56] References Cited

UNITED STATES PATENTS

| 2,333,740 | 11/1943 | Rasmussen | 30/260 |
| 2,666,258 | 1/1954 | Vogel | 30/349 |
| 2,819,523 | 1/1958 | Stoeveken | 30/260 |
| 3,064,351 | 11/1962 | Kuchta | 30/248 |

FOREIGN PATENTS OR APPLICATIONS

| 656,284 | 8/1951 | Great Britain | 30/260 |

*Primary Examiner*—Theron E. Condon
*Assistant Examiner*—J. C. Peters
*Attorney*—William J. Ruano

[57] ABSTRACT

Grass shears in which a composite movable blade is made in the form of a casting with a curvature which serves as a backup or support for a separate flexible cutting blade which can be bent to conform to the curved shape of the support and which is detachably secured to such support so as to be readily replaceable.

2 Claims, 3 Drawing Figures

PATENTED FEB 15 1972

3,641,669

INVENTOR.
DAVID HOWARD KEISER, JR.
BY
William J. Ruano
his ATTORNEY

GRASS SHEARS

This invention relates to grass shears, although useful for hedge shears and the like, and is more particularly related to the construction of the movable blade thereof.

An outstanding disadvantage of presently used types of grass shears, such as shears wherein a "pushing" action is applied to laterally cant a movable blade as it cooperates with a stationary blade, is that the fabrication of the movable blade involves considerable time and expense for properly shaping and treating the blade. Such movable blade is generally cast and tempered and the manufacturing operations are painstaking, time consuming and expensive for obtaining desired precision shaping and curvature of the movable blade.

Another disadvantage of conventionally used movable blades for shears is that they must be replaced from time to time and the cost for such replacement is high and requires complete disassembly of the shears for replacing such blades.

An object of the present invention is to provide novel grass shears having a movable blade construction which can be manufactured quickly and inexpensively, also which may be readily replaced without disassembly of the shears, requiring replacement solely of a thin blade unit, as compared to the entire lever and blade unit, therefore providing relatively long life at minimum expense.

Other objects and advantages will become more apparent from a study of the following description taken with the accompanying drawing wherein.

Figure 1:
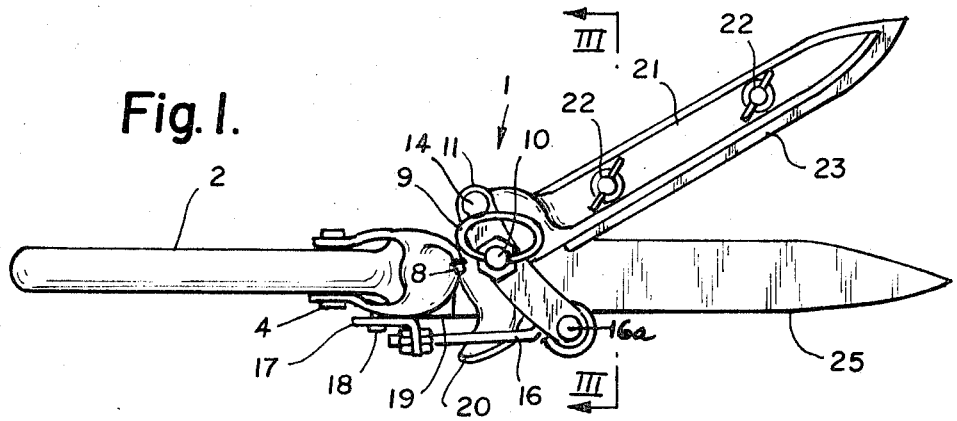
FIG. 1 is a top or plan view of grass shears including a composite movable blade embodying the principles of the present invention.

Referring more particularly to the drawing, numeral 1 generally denotes a pair of grass shear, such as the type in which the movable blade has a "push" action, instead of a pull action, such as described in my U.S. Pat. No. 2,661,534.

Such shears comprise a handle 2 integrally secured to a stationary blade 25 and a handle 3 pivotally mounted at 4 to the handle 2. A return spring 5 is interposed between the end 19 of handle 2 and an integral projecting portion 6 of handle 2 so as to normally spread the handles apart.

Figure 2:
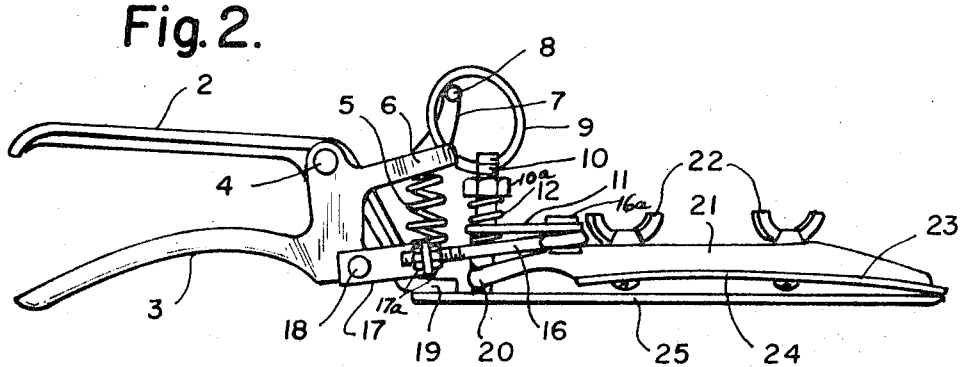
FIG. 2 is a side view of the shears shown in FIG. 1.

When handle 3 is grasped and pulled toward handle 2 by squeezing action of the hand, spring 5 is compressed and the flange 17, which is pivoted at 18 to handle 3, is pulled to the left, as viewed in FIGS. 1 and 2, so as to pull with it the threaded shank of an eye bolt 16. The threaded shank is adjustably connected by the nuts 17a to flange 17 and the eye portion is pivotally connected by pin 16a to one end of a lever 11. An intermediate portion of lever 11 has a hole which is in registry with a hole at one end of the movable support 21. Spring 12 is interposed between lever 11 and a nut 10a. Spring 13 is interposed between lever 11 and the base end of stationary blade 25. To said base end there is integrally secured an upstanding bolt 10 which fits loosely through a substantially central hole in lever 11. Support 21 has a hole in its base end, through which bolt 10 extends, and has a base extension with an integral upstanding pin 14 fitting loosely in a hole in the outer end of lever 11.

In operation, when eye bolt 16 is pulled back by squeezing handles 2 and 3 together, lever 11 is rocked about bolt 10 as a pivot. As lever 11 is pivoted clockwise about bolt 10, as viewed in FIG. 1, it will pull high on pin 14 and thus exert a small lateral tilting action of blade support 21 about pin 10 as a pivot "push" action, during cutting movements on movable blade support 21.

Figure 3:
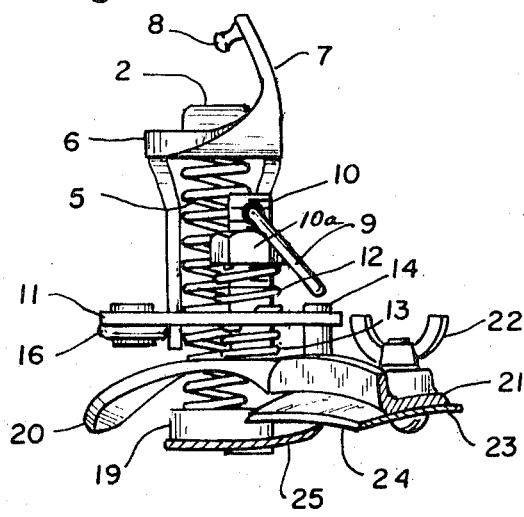
FIG. 3 is a cross-sectional view taken along line III—III of FIG. 1.

The shears may be locked in the closed position by passing ring 9 onto the lateral projection 8, as shown more clearly in FIGS. 2 and 3. Stop 20 engages end 19 to limit closing movement.

The main feature of the present invention resides in the composite construction of the movable blade comprising the blade carrier or support 21 having an upwardly flanged edge portion along one side, as will be more apparent in FIG. 2, and having wingnuts 22 or other detachable fastening means which, upon tightening, will clamp a separate flexible cutting blade 23 thereto. As will be noted in FIG. 2, the movable blade carrier 21 is not only slightly laterally tilted relative to the stationary blade 25 but is progressively curved downwardly in a longitudinal direction. This enables the cutting edges of the blades to make contact at only one point when the handles are spread apart, which contact moves progressively outwardly in the longitudinal direction of the blades until reaching their extremities as shown in FIG. 2 when the handles are held tightly in the closed position of the blades.

An important feature of the separate cutting blade 23 is that such blade may be made sufficiently flexible so that it can be bent and forced to assume the curvature of the bottom of the blade carrier 21 (see FIG. 2). Thus, the blade carrier 21 may be made by casting and without requiring tempering or edge sharpening since all of this is done only to the blade 23. Moreover, when it is desired to replace blade 23 because of dullness, it may be easily and quickly removed simply by unscrewing wingnuts 22 and replacing blade 23 with another flat but flexible blade with a sharp edge, which blade can be forced to assume the curvature of carrier 21 by retightening wingnuts 22. Of course, plain nuts may replace wingnuts 22.

Thus it will be seen that I have provided, in a pair of grass shears, such as those with a "push" action on a movable blade, or other types of grass shears, a composite movable blade made up of a cast support having a predetermined curvature and to which a flexible blade, having a cutting edge 24 is detachably fastened so that it may be readily removed and replaced. Such support does not require the tempering or other necessary manufacturing treatments necessary for the replaceable blade 23.

While I have illustrated and described a single specific embodiment of my invention, it will be understood that this is by way of illustration only and that various changes and modifications may be made within the scope of the following claims.

I claim:

1. In a pair of grass shears or the like, a stationary blade integrally secured to a longitudinally offset and substantially parallel, stationary handle, an integral pivot post extending upwardly at right angles from the end of said stationary blade nearest said stationary handle, a movable blade support member in the form of a casting curved in a longitudinal direction progressively toward said stationary blade and having substantially the shape of a movable blade and which is loosely pivoted on said post sufficient to allow lateral canting thereof relative to said stationary blade, said casting having an integral flange extending upwardly and longitudinally thereof to maintain said curvature of said support member, a thin, flexible movable blade detachably secured to said support member, operating means including a lever pivoted to said post and spaced above said support member and connected to said support member adjacent the rear, noncutting edge of said flexible movable blade, a movable handle pivotally connected to said stationary handle and loosely connected to said operating means so that closing movement of said blades will cause laterally downward tilting movement of said flexible movable blade relative to said stationary blade and will cause contact of said cutting edges of the blades at only one point, which contact moves progressively outwardly in the longitudinal direction of the blades, and return spring means for effecting opening movement of said blades upon release of said handles.

2. A pair of shears as recited in claim 1 wherein said flexible movable blade is of tempered steel and wherein said casting is untempered.

* * * * *